United States Patent [19]

Goossens et al.

[11] Patent Number: 4,528,350

[45] Date of Patent: Jul. 9, 1985

[54] POLYMERS OF $\alpha,\beta$-UNSATURATED N-SUBSTITUTED CARBOXYLIC ACID AMIDES

[75] Inventors: Bernhard Goossens, Velbert; Erich Küster, Krefeld; Kurt Dahmen, Monchen-Gladbach; Eduard Barthell, Krefeld, all of Fed. Rep. of Germany

[73] Assignee: Chemische Fabrik Stockhausen & Cie, Krefeld, Fed. Rep. of Germany

[21] Appl. No.: 512,496

[22] Filed: Jul. 11, 1983

Related U.S. Application Data

[62] Division of Ser. No. 107,245, Dec. 26, 1979, Pat. No. 4,408,073.

[30] Foreign Application Priority Data

Dec. 27, 1978 [DE] Fed. Rep. of Germany ....... 2856383
Mar. 24, 1979 [DE] Fed. Rep. of Germany ....... 2911642

[51] Int. Cl.³ .............................................. C08F 20/60
[52] U.S. Cl. ..................................... 526/307; 526/305
[58] Field of Search ..................... 526/305, 307

[56] References Cited

U.S. PATENT DOCUMENTS

| | | | |
|---|---|---|---|
| 2,649,438 | 8/1953 | Bruson | 564/204 |
| 2,980,657 | 4/1961 | Melamed | 564/204 |
| 3,043,822 | 7/1962 | Maeder | 526/307 |
| 3,170,901 | 2/1965 | Melamed | 526/307 |
| 3,188,228 | 8/1965 | Magat et al. | 117/62 |
| 3,424,820 | 1/1969 | Magat et al. | |
| 3,883,491 | 5/1975 | Hoke | 526/307 |
| 4,031,138 | 6/1977 | Nieh et al. | 564/205 |
| 4,237,067 | 12/1980 | Küster et al. | 564/205 |

*Primary Examiner*—Paul R. Michl
*Attorney, Agent, or Firm*—Sprung, Horn, Kramer & Woods

[57] ABSTRACT

The invention relates to a process for the preparation of $\alpha,\beta$-unsaturated N-substituted carboxylic acid amides, novel $\alpha,\beta$-unsaturated N-substituted carboxylic acid amides, a process for the polymerization of these novel $\alpha,\beta$-unsaturated N-substituted carboxylic acid amides, including the polymers, and the use of these polymers as sedimentation, flocculating, dewatering and retention aids, as additives for mineral oils, and as ion exchangers.

The $\alpha,\beta$-unsaturated N-substituted carboxylic acid amides are prepared by transamidation of $\beta$-hydroxy or $\beta$-alkoxy carboxylic acid amides with primary amines and heating of the N-substituted $\beta$-hydroxy or $\beta$-alkoxy carboxylic acid amides obtained as intermediate products in the vapor phase in the presence of catalysts. Primary amines are preferably used in the conversion which have no hydrogen beta to the amino group.

These $\alpha,\beta$-unsaturated carboxylic acid amides may be neutralized and/or quaternized and polymerized by processes which as such are known alone or with other comonomers, and preferably acrylic or methacrylic acid derivatives such as acrylamide, to give cationic polymers. These polymers are suited for use as flocculating and sedimentation aids, as dewatering and retention aids in papermaking, as additives for mineral oils, and as ion exchangers.

8 Claims, No Drawings

POLYMERS OF α,β-UNSATURATED N-SUBSTITUTED CARBOXYLIC ACID AMIDES

This is a division of application Ser. No. 107,245 filed Dec. 26, 1979 now U.S. Pat. No. 4,408,073.

N-substituted alkylacrylamides have been known for some time. They may be prepared by reaction of acrylonitrile with 1-olefins (JACS 73, 1951, 4076) and by reaction of primary and secondary amines with an addition compound of maleic anhydride and triphenylphosphine (Japanese Pat. No. 6,920,083). According to British Pat. No. 746,747, N-substituted acrylamides can be obtained by dehydrohalogenation of β-chloropropionic acid amides, and according to German Patent Application DOS No. 2,344,070 by pyrolysis of β-methoxypropionic acid amides. They can also be prepared by the process employing the Schotten-Baumann reaction by reaction of acrylic acid chloride with appropriate diamines (U.S. Pat. No. 2,951,907), by catalytic addition of functionalized amines to acetylene under a CO atmosphere (U.S. Pat. No. 2,773,063), by reductive amination of diacetone acrylamide (J. Polym. Sci. 10 [1972], 595), and by pyrolysis of norbornene derivatives (German Patent Application DOS No. 2,354,602). Finally, these compounds can be obtained also by the process according to German Patent Application DOS Nos. 2,502,247 and 2,656,682 and U.S. Pat. No. 3,878,247, wherein amines are added to acrylic or methacrylic acid esters with concurrent aminolysis, N-substituted β-aminopropionic acid amides being so obtained which are pyrolytically decomposed to the corresponding α,β-unsaturated carboxylic acid N-substituted amides. In the earlier German Patent Application Nos. P 28 19 735 and P 28 36 520, which do not constitute anticipations, processes are described for the preparation of α,β-unsaturated acid N-substituted amides by reaction of β-hydroxy or β-alkoxy acid amides with amines to eliminate ammonia and conversion of the N-substituted hydroxy- or alkoxy acid amides formed by dehydration or by dealcoholysis to the corresponding α,β-unsatureated N-substituted acid amides by heating in the liquid phase in the presence of catalysts.

It has now been found that α,β-unsaturated N-substituted acid amides can also be prepared, in technically simple manner and in high yields, by dehydration or dealcoholysis of the β-hydroxy- or β-alkoxy carboxylic acid N-substituted amides, obtained by transamidation of β-hydroxy- or β-alkoxy-carboxylic acid amides with amines, in vapor phase to the desired α,β-unsaturated carboxylic acid N-substituted amides.

The invention thus has as its object a process for the preparation of α,β-unsaturated carboxylic acid amides of the general formula

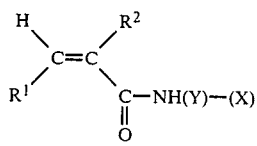

wherein

R¹ and R² are hydrogen or methyl,

Y is a divalent straight- or branched-chain organic moiety with from 2 to 30, and preferably 2 to 18, carbon atoms, and preferably a group of the formula —(Y₁)ₘ—(Y₂)ₙ—(Y₃)ₜ—, Y₁, Y₂ and Y₃ represent an alkylene group or the moiety of a cyclic ring system with 5 or 6 carbon atoms, and the sum of m, n and t is 2 or 3; and X is hydrogen or the radical of an amine of the formula —N(R⁴)(R⁵), and R⁴ and R⁵ represent alkyl radicals having 1 to 4 carbon atoms, by transamidation of β-substituted carboxylic acid amides with primary amines of the general formula

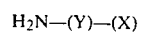

where Y and X have the meaning given above, with elimination of ammonia and conversion of the carboxylic acid N-substituted amides formed to α,β-unsaturated acid N-substituted amides, said process being characterized in that the starting materials used are β-substituted carboxylic acid amides of the general formula

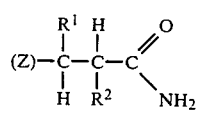

wherein

R¹ and R² are hydrogen or methyl prespectively, and

Z is a hydroxy group or an alkylene radical having 1 to 4 carbon atoms, and that the conversion of the resulting β-hydroxy- or β-alkoxy-carboxylic acid amides to the α,β-unsaturated carboxylic acid N-substituted amides is effected by heating in vapor phase in the presence of catalysts.

The conversion of the β-hydroxy- or β-alkoxy-carboxylic acid N-substituted amides to α,β-unsaturated carboxylic acid N-substituted amides by dehydration or dealcoholysis thus is no longer carried out in the liquid phase; rather, β-hydroxy- or β-alkoxy-carboxylic acid is evaporated for the purpose of splitting off water or alcohol, respectively, preferably under mild conditions, and the vapors are conducted over a solid catalyst which is advantageously disposed in a heatable reaction tube. For gentle evaporation, a vacuum evaporator is preferably used. For still gentler treatment, the evaporation may optionally be carried out under vacuum. In contrast to pyrolysis in liquid phase, in which the sump is thermally stressed for a prolonged time, the retention time in the hot reaction tube in the instant process is very short, and the risk of side reactions such as polymerization or condensation of the β-hydroxy-carboxylic acid N-substituted amide to polyester, attended by splitting off of amine, which cannot be avoided when operating in liquid phase at elevated temperature, therefore is minimized.

The transamidation is advantageously effected at a temperature ranging from 100° to 200° C., optionally with addition of catalytic amounts of acid. It has been found that especially when β-alkoxy-carboxylic acid amides are used, from 0.5 to 1.0 mole percent of acetic acid is particularly well suited for use as catalyst. Acid amide and amine can be caused to react simply by heating, without the addition of a solvent, the ammonia formed being driven off to shift the reaction equilibrium in the direction of the desired products (β-hydroxy- or β-alkoxy-acid N-substituted amide).

The transamidation can also be effected under normal pressure without the addition of a catalyst, amines having boiling points above 110° C. being used in order to limit the reaction time to about 6 hours.

Preferred are amines which in addition form a homogeneous phase with the molten acid amide or which are partially soluble in the molten acid amide or which themselves dissolve part of the acid amide.

Reduced reciprocal solvency may retard the reaction initially; however, as the conversion proceeds the reaction rate increases since the β-hydroxy- or β-alkoxy-acid N-substituted amide formed serves as a solubilizing aid and a homogeneous phase begins to form. Of advantage is the addition of from 5 to 10% of the particular β-hydroxy- or β-alkoxy-carboxylic acid N-substituted amide in order to bridge over over this initial induction period.

The particular amine may be used in excess based on the hydroxy- or alkoxy-amide.

The dehydration or dealcoholysis is preferably carried out at a temperature ranging from about 200° to 400° C. In the case of β-hydroxy- or β-alkoxy-carboxylic acid amides containing amino groups, temperatures up to 250° C. have proved sufficient.

Suitable for use as dehydration catalysts are, in particular, metal oxides such as aluminum oxide. Mixtures of oxides, such as aluminum oxide/silicon dioxide, or impregnated carriers, for example, acidic aluminum oxide or pumice impregnated with phosphoric acid, are also suitable, as are salts such as aluminum phosphate or boron phosphate. Suitable solid catalysts for the dealcoholysis are, in particular, mineral oxides of acidic or basic character, such as aluminum oxide, silicon dioxide or barium oxide, which optionally may be impregnated with acids such as phosphoric acid or with bases such as sodium hydroxide.

For the purposes of the invention, the preferred β-hydroxy-carboxylic acid amides are β-hydroxy-propionic acid amide or β-hydroxy-butyric acid amide.

Examples of suitable amines of the general formula $$H_2N-(Y)-(X) \quad (II)$$

are 2-dimethylaminoethylamine, 2-diethylaminoethylamine, 3-dimethylaminopropylamine, benzylamine, cyclohexylamine, dodecylamine and stearylamine.

Amines are preferably used which have the general formula

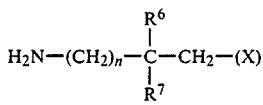

wherein $R^6$ and $R^7$ may be alkyl groups, and preferably lower alkyl groups having 1 to 4 carbon atoms and in particular methyl, or aryl groups, or together form an aliphatic ring, and in particular the cyclohexyl or cyclopentyl moiety; n is a number from 0 to 10; and X is the radical of an amine of the formula $-N(R^4)(R^5)$, $R^4$ and $R^5$ representing alkyl radicals having 1 to 4 carbon atoms, or cycloalkyl radicals having 3 to 8 carbon atoms.

The divalent organic radical Y may be a straight- or branched-chain alkylene radical, optionally substituted. When Y represents a group of the formula $-(Y_1)_m-(Y_2)_n-(Y_3)_l-$, then each of the moieties $Y_1$, $Y_2$ and $Y_3$ may be a straight- or branched-chain alkylene radical, optionally substituted, or the radical of a cylic organic ring system having 5 or 6 carbon atoms. The cycloalkyl radical may optionally likewise be substituted, for example, by alkyl.

When X stands for the radical of an amine of the formula $-N(R^4)(R^5)$, these radicals $R^4$ and $R^5$, which may be the same or different, may represent straight- or branched-chain alkyl radicals, for example, methyl, ethyl, propyl, isopropyl or n-butyl, or cycloalkyl radicals such as cyclopropyl, cyclobutyl, cyclopentyl or cyclohexyl.

Similarly, Z in formula (III) represents the moiety of an alcohol of the formula $R^8O$, where $R^8$ is a straight- or branched-chain alkyl radical such as methyl, ethyl, propyl, isopropyl or n-butyl.

Examples of such preferred amines are amines of the N',N',2,2-tetramethylpropylenediamine-1,3(dimethylamino neopentylamine) type (formula II', n=1, $R^6=R^7=CH_3$), and more particularly:

3-dimethylamino-2,2-dimethylpropylamine
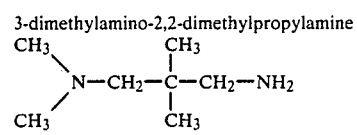

3-diethylamino-2,2-dimethylpropylamine
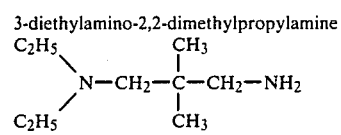

3-dibutylamino-2,2-dimethylpropylamine
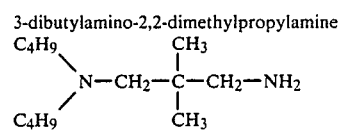

4-dimethylamino-3,3-dimethylbutylamine-1
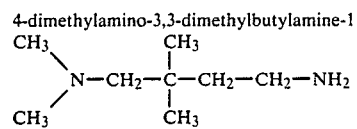

5-dimethylamino-4,4-dimethylpentylamine-1
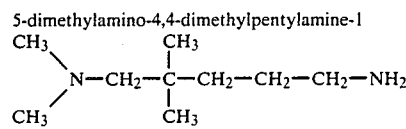

5-diethylamino-4,4-dimethylpentylamine-1
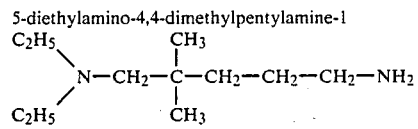

3-dimethylamino-2-ethyl-2-methylpropylamine
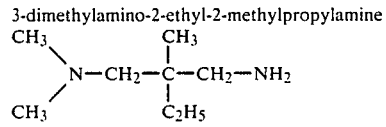

3-dimethylamino-2-methyl-2-phenylpropylamine
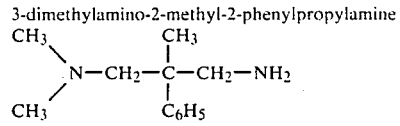

and 3-dimethylamino-2-ethyl-2-butylpropylamine
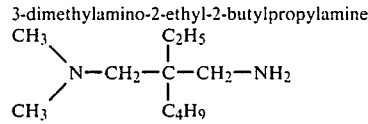

-continued as well as 1-(aminomethylene)-1-(dimethylaminomethylene)-cyclohexene

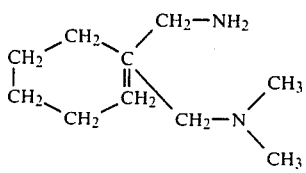

In these amines, the carbon atom which is beta to the tertiary amino group does not carry a hydrogen but instead is alkyl-substituted. These alkyls of the general formula (II), which do not carry hydrogen atoms on the nitrogen beta to the tertiary nitrogen, are preferred in accordance with the invention because in the reaction products obtained by the use of these amines no heat-induced beta elimination of amine can occur. This splitting off of amine, which with monomeric $\alpha,\beta$-unsaturated, N-substituted acid amides would result in a further terminal double bond in addition to the $\alpha,\beta$ double bond, is highly undesirable when using the monomeric acid amides in the preparation of water-soluble polymers since that double bond would be available for unwanted crosslinking.

Moreover, by proper choice of the beta substituents, the hydrophilic or hydrophobic properties of the monomers and of the polymers produced therefrom can be modified in accordance with the end use.

The invention further has as its object novel $\alpha,\beta$-unsaturated carboxylic acid N-substituted amides of the general formula

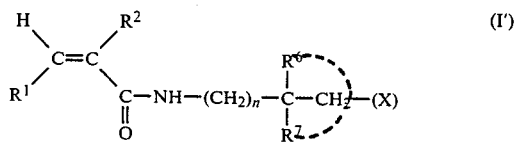

wherein $R_1$ and $R_2$ is hydrogen or methyl, $R_6$ and $R_7$ are alkyl groups, and preferably lower alkyl groups having 1 to 4 carbon atoms, and in particular methyl or aryl groups, or $R_6$ and $R_7$ together are a constituent of an aliphatic ring, and in particular of the cyclopentyl or cyclohexyl ring, n is an integer from 0 to 10, and X is the radical of an amine of the formula $-N(R_4)(R_5)$, $R_4$ and $R_5$ representing alkyl radicals having 1 to 4 carbon atoms, or cycloalkyl radicals having 3 to 8 carbon atoms.

The $\alpha,\beta$-unsaturated carboxylic acid N-substituted amides in accordance with the invention can readily be polymerized, either alone or with other polymerizable monomers, by known processes, to homopolymers, copolymers and other subpolymers. These polymers are excellent flocculants and dewatering aids for use in waste-water treatment, and they are further adapted to improve the dry and wet strengths of paper and are also suited for use as retention aids. The elimination of amine in these polymers would reduce their specific activity and, in extreme cases, render them completely ineffective.

The invention therefore has as a further object a process for the production of polymers of compounds prepared in accordance with claims 1 to 8 which contain repeating units of the formula

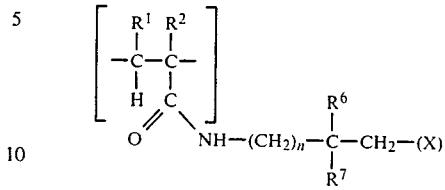

wherein $R^1$, $R^2$, $R^6$, $R^7$, X and n have the meaning given in formula (I), said process being characterized in that the unsaturated starting compound is polymerized alone or with other polymerizable monomers by processes which are known per se, as well as the polymers obtained by such process.

The polymerization is conducted conventionally. It may be initiated thermally, photochemically, by radiation, or with the usual radical initiators. It may be carried out in solution, suspension or emulsion. Suitable initiators are, for example, inorganic peroxides such as hydrogen peroxide; organic hydroperoxides and peroxides such as tert-butyl hydroperoxide, cumene hydroperoxide or dibenzoyl peroxide; aliphatic azo compounds decomposing into radicals, such as 2,2'-azobisisobutyronitrile; redox catalyst systems such as persulfate or chlorate with disulfite or iron(III) salts; and transition-metal chelates which are known radical formers. The initiators are generally used in an amount of from 0.001 to 1 weight percent, based on the amount of monomer. The optimum amount and the most effective initiator can readily be determined by experimentation.

The polymerization is advantageously conducted in the presence of a solvent or diluent. The suspension, solution or emulsion polymerization processes used with other monomers may be used also for the polymers in accordance with the invention. Optionally such auxiliaries as buffers, dispersants, protective colloids and the like may be used.

Suitable comonomers are compounds containing a polymerizable double bond, and in particular:

vinyl aromatics such as styrene, α-methylstyrene, and vinylpyridine;

acrylonitriles such as acrylonitrile and methacrylonitrile;

acrylamides such as acrylamide, methacrylamide and N-mono- and N-disubstituted acrylamides and methacrylamides;

acrylic and methacrylic acid esters;

acrylic and methacrylic acids;

vinyl esters and vinyl ethers;

fumaric and maleic acids and their derivatives; and compounds containing more than one polymerizable double bond, for example, divinylbenzene, methylenebisacrylamide and allyl acrylate.

Particularly preferred is acrylamide.

The composition of the copolymers in accordance with the invention may vary widely. Copolymers in accordance with the invention may contain relatively small amounts of monomers in accordance with the invention, for example, 5 weight percent, while the remaining 95 weight percent, for example, is made up of other comonomers.

However, the invention also includes copolymers with a high proportion, for example, 50 to 95 weight percent, of monomers in accordance with the invention and 50 to 5 weight percent of other comonomers. The homopolymers of the polymers in accordance with the invention of course also fall within the scope of the invention. Preferred copolymers consist to the extent of 5 to 60 weight percent, and more particularly 10 to 50 weight percent, of monomers in accordance with the invention, that is to say, of unsaturated carboxylic acid amides of formula (I'), and to the extent of 95 to 40 weight percent, and more particularly 90 to 50 weight percent, of other comonomers, the preferred comonomers being acrylic or methacrylic acid derivatives such as acrylamide and methacrylamide, or acrylic or methacrylic acid esters.

The invention has a further object polymers of α,β-unsaturated carboxylic acid N-substituted amides in accordance with claims 1 to 8 which are characterized by smallest repeating units of the formula

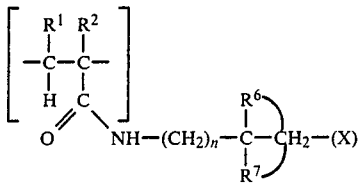

wherein $R_1$, $R_2$, $R_6$ and $R_7$ have the meanings given in formula (I').

The monomeric products in accordance with the invention can be neutralized and/or quaternized, and the polymers produced from these cationic monomers are not only excellent flocculating and dewatering aids for use in waste-water treatment and as aids in improving the dry and wet strengths of paper and also as retention aids but because of their high-temperature stability can also be used to advantage as viscosity regulators and dispersants in lubricants.

Moreover, anion exchanger resins may be obtained by conducting the polymerization in the presence of defined amounts of crosslinking agents.

For use as flocculating and dewatering aids, the polymers in accordance with the invention preferably have molecular weights on the order of 5 to 10 million; for use as aids in papermaking, preferably from about 1 to 5 million; and for use in the other applications mentioned, preferably under 1 million.

The examples which follow will serve to illustrate the invention.

EXAMPLE 1

N-(N'N',2',2'-tetramethylaminopropyl)acrylamide (TEMAPA)

471 g β-hydroxypropionamide and 722 g N,N,2,2-tetramethylpropylenediamine-1,3 were heated for 7 hours over a temperature range from 140° to 160° C. until the liberation of ammonia ceased. The evaporation by means of a thin-layer evaporator which followed yielded 1058 g β-hydroxy-N-(N',N',2',2'-tetramethylaminopropyl)propionic acid amide, boiling point 206° C./10 mm Hg.

NMR (CDCl$_3$): δ=0.9 (s,6); 2.25 (s,2); 2.3 (s,6); 2.45 (t,2); 3.2 (d,2); 3.9 (t,2).

917 g of the hydroxy product was then successively evaporated in the thin-layer evaporator (230° C. evaporator temperature, vacuum 10 millibars) and the vapors were conducted through a reaction tube which had been filled with 700 g alumina and heated to 220° C. During the 3.5-hour process, 727 g N-(N',N',2',2'-tetramethylaminopropyl)acrylamide was obtained. Boiling point, 137° C./10 millibars.

NMR (CDCl$_3$): δ=0.9 (s,6); 2.3 (m,8); 3.25 (d,2); 5.4 to 6.2 (m,3).

EXAMPLE 2

N-(N',N',2,2-tetramethyl-3-aminopropyl)-3-methoxypropionamide 412.5 g (4.0 moles) 3-methoxypropionamide was heated with 547 g (4.2 moles) N,N,2,2-tetramethylpropanediamine-1,3 and 4 ml glacial acetic acid for 8 hours over a temperature range from 145° to 170° C. until the liberation of ammonia ceased. The high-vacuum distillation which followed yielded 820 g (3.8 moles=95% of theory) of a colorless liquid with a boiling point$_{0.2}$ of 105° to 108° C.

NMR (in CCl$_4$): δ=0.9 (s,6); 2.0 to 2.5 (m,10); 3.05 (d,2); 3.3 (s,3); 3.55 (t,2); 7.40 (m,1).

N-(N',N',2,2-tetramethyl-3-aminopropyl)acrylamide

A total of 820 g (3.8 moles) N-(N',N',2,2-tetramethyl-3-aminopropyl)-3-methoxypropionamide was fed continuously to an evaporator flask heated to 170° to 180° C., and the vapors were conducted under a vacuum of 14 millibars to a reaction tube 1 meter long and 3 cm in diameter which was heated externally, by means of a strip heater, to 300° C. and was filled with alumina beads impregnated with 10% sodium hydroxide. With a head temperature ranging from 150° to 220° C., about 475 g of a yellow oil was collected over a period of 2 hours, which for further purification was distilled once more in a high vacuum. 383 g (2.1 moles=52% of theory, based on 3-methoxypropionamide) of a product having a boiling point$_{0.2}$ of 98° to 102° C. was obtained.

NMR (in CCl$_4$): δ=0.9 (s,6); 2.1 (s,2); 2.3 (s,6); 3.15 (d,2); 5.3 to 6.5 (m,3); 8.0 (m,1).

EXAMPLE 3

N-(N'N',2,2-tetramethyl-3-aminopropyl)-2-methyl-3-methoxypropionamide

By the procedure of Example 2, there was obtained from 468.6 g (4.0 moles) 2-methyl-3-methoxypropionamide 857 g (3.7 moles=93% of theory) of a colorless liquid having a boiling point$_{0.2}$ of 102° to 106° C.

NMR (in CCl$_4$): δ=0.9 (s,6); 1.05 (d,3); 2.0 to 2.7 (m,9); 3.05 (d,2); 3.2 to 3.6 (m,5); 7.3 (m,1).

N-(N',N',2,2-tetramethyl-3-aminopropyl)methacrylamide (TEMAPA)

Analogously to Example 2, 510 g of product was obtained from 857 g (3.7 moles) of starting product. High-vacuum distillation yielded 420 g (2.1 moles=53% of theory, based on 2-methyl-3-methoxypropionamide) with a boiling point$_{0.2}$ of 92° to 94° C.

MNR (in CCl$_4$): δ=0.9 (s,6); 1.9 (d,3); 2.2 (s,2); 2.3 (s,6); 3.1 (d,2); 5.1 to 5.7 (m,2); 8.0 (m,1).

EXAMPLE 4

N-(N',N',2',2'-tetramethylaminopropyl)-crotonic acid amide 412 g β-hydroxybutyric acid amide and 546 g N,N,2,2-tetramethylpropylenediamine-1,3 were heated for 16 hours over a temperature range of 148° to 160° C. 829 g of the reaction product was fed successively, by means of a thin-layer evaporator (250° C./10 millibars), as vapor to a reaction tube which had been heated to 220° C. and filled with 700 g alumina. During the 4-hour process, 543 g N-(N',N',2',2'-tetramethylaminopropyl)-crotonic acid amide was obtained.

MNR (CDCl₃): δ=0.9 (s,6); 1.9 (dd,3); 2.15 to 2.6 (m,8); 3.35 (m,2); 5.6 to 7.0 (m,2).

EXAMPLE 5

N-(N',N',2,2-tetramethyl-3-aminopropyl)-3-methoxybutyric acid amide

By the procedure of Example 2, there is obtained from 468.6 g (4.0 moles) 3-methoxybutyric acid amide 800 g (3.5 moles=87% of theory) of a pale-yellow liquid having a boiling point$_{0.2}$ of 112° to 114° C.

NMR (in CDCl₃): δ=0.9 (s,6); 1.15 (d,3); 2.0 to 2.5 (m,10); 3.1 (d,2); 3.35 (s,3); 3.7 (q,1); 7.7 (m,1).

N-(N',N',2,2-tetramethyl-3-aminopropyl)-crotonic acid amide

Analogously to Example 2, there is obtained from 800 g (3.5 moles) of starting product 587 g of product which after high-vacuum distillation yields 516 g (2.6 moles=65% of theory, based on 3-methoxybutyric acid amide) of a pale-yellow, viscous oil having a boiling point$_{0.2}$ of 104° to 108° C.

NMR (in CCl₄): δ=0.9 (s,6); 1.8 (dd,3); 2.1 (s,2); 2.3 (s,6); 5.6 to 7.0 (m,2); 7.6 (m,1).

Analogously to Examples 1 to 5, there are obtained by reaction of the appropriate amines with the corresponding β-hydroxy- or β-methoxy-carboxylic acid amides in molar-equivalent amounts:

6. N-(3-diethylamino-2,2-dimethylpropyl)acrylamide Boiling point, 110° C./0.1 millibar
7. N-(3-diethylamino-2,2-dimethylpropyl)methacrylamide Boiling point, 117° C./0.1 millibar
8. N-(3-diethylamino-2,2-dimethylpropyl)crotonamide Boiling point, 113° C./0.035 millibar
9. N-(3-dibutylamino-2,2-dimethylpropyl)acrylamide Boiling point, 155° C./0.09 millibar
10. N-(3-dibutylamino-2,2-dimethylpropyl)methacrylamide Boiling point, 125° C./0.032 millibar
11. N-(3-dibutylamino-2,2-dimethylpropyl)crotonamide Boiling point, 129° C./0.03 millibar
N-(4-dimethylamino-3,3-dimethylbutyl)acrylamide Boiling point, 107° C./0.08 millibar
13. N-(4-dimethylamino-3,3-dimethylbutyl)methacrylamide Boiling point, 113° C./0.14 millibar
14. N-(4-dimethylamino-3,3-dimethylbutyl)crotonamide Boiling point, 120° C./0.03 millibar
15. N-(5-dimethylamino-4,4-dimethylpentyl)acrylamide Boiling point, 127° C./0.03 millibar
16. N-(5-dimethylamino-4,4-dimethylpentyl)methacrylamide Boiling point, 127° C./0.04 millibar
17. N-(5-dimethylamino-4,4-dimethylpentyl)crotonamide Boiling point, 134° C./0.03 millibar
18. N-(5-diethylamino-4,4-dimethylpentyl)acrylamide Boiling point, 130° C./0.06 millibar
19. N-(5-diethylamino-4,4-dimethylpentyl)methacrylamide Boiling point, 132° C./0.035 millibar
20. N-(3-dimethylamino-2-ethyl-2-methylpropyl)acrylamide Boiling point, 98° C./0.03 millibar
21. N-(3-dimethylamino-2-ethyl-2-methylpropyl)methacrylamide Boiling point, 98° C./0.06 millibar
22. N-(3-dimethylamino-2-methyl-2-phenylpropyl)acrylamide Boiling point, 128° C./0.06 millibar The amino compounds prepared in the manner described above may be converted to the corresponding amine salts by reaction with an appropriate acid (for example, sulfuric acid) or may be quaternized with an appropriate alkyl halide or alkyl sulfate. This will be illustrated by the examples which follow.

EXAMPLE 23

Trimethyl-3-(1-acrylamido-2,2-dimethylpropyl)-ammonium methosulfate

To a solution of 289.5 g N-(N',N',2',2'-tetramethylaminopropyl)-acrylamide in 317 g water, there was added dropwise, with stirring and cooling with ice, 185.4 g dimethylsulfate over a period of 2.5 hours. After further reaction for 3 hours, a 60% solution of the quaternary product was obtained.

EXAMPLE 24

(3-acrylamido-2,2-dimethylpropyl)-trimethylammonium chloride

Into a vigorously stirred 80° C. solution of 376 g N-(3-dimethylamino-2,2-dimethylpropyl)-acrylamide (TEMAPA of Example 1) in 320 g water, there was introduced over a period of 3.5 hours under a working pressure of 0.4 bar 103 g methyl chloride. An aqueous solution of the quaternary product was obtained.

The acrylamido compounds of the invention may be polymerized either alone or with other polymerizable monomers to give copolymers or other subpolymers, as will be shown in the following examples.

EXAMPLE 25

Homopolymer TEMAPA.½H₂SO₄

160 g N-(N',N',2',2'-tetramethylaminopropyl)-acrylamide was dissolved in 85 g water and acidified with 199.5 g 20% sulfuric acid. The solution was heated to 55° C. and polymerization was initiated by the addition of 80 mg azobisisobutyronitirile. After being allowed to stand for 2 hours, the gel-like polymerization product was comminuted, dried and ground to a white powder. Residual monomer content: 0.72%. Viscosity (1% aqueous solution): 184 mPa/s.

EXAMPLE 26

Copolymer TEMAPA.½H₂SO₄/acrylamide 80 g N-(N',N',2',2'-tetramethylaminopropyl)-acrylamide was dissolved in 386 g water and acidified with 100 g 20% sulfuric acid. After addition of 100 g acrylamide, the solution was heated to 55° C. and polymerization was initiated with 80 mg azobisisobutyronitrile. After being allowed to stand for 3 hours, the gel-like copolymerization product was comminuted, dried and ground to give a white powder.

Residual monomer content: 0.7%.

Viscosity (1% aqueous solution): 1200 mPa/s.

EXAMPLE 27

Homopolymer of TEMAPA.CH₃Cl 200 g TEMAPA.CH₃Cl was dissolved in 380 g water and adjusted to pH 4. After purging with nitrogen, polymerization was initiated by addition of 3 mg potassium persulfate, 2 mg sodium disulfite, 0.2 mg iron(II) sulfate and 30 mg 2,2'-azobis-(2-amidinopropane)dihydrochloride (AIBA). The gel obtained was dried to a residual water content of 10% and ground. Limiting viscosity (10% sodium chloride solution): 387.5 ml/g.

EXAMPLE 28

Copolymer of acrylamide (78 wt. %) and
TEMAPA.½H$_2$SO$_4$(22 wt. %)

234 g acrylamide and 66 g TEMAPA.½H$_2$SO$_4$ were mixed in 700 g water with 30 mg AIBA and, after nitrogen had been passed through the solution, exposed for 30 minutes to the light from a lamp (OSRAM HWL 250 watts). The gel obtained was dried to a residual water content of 11% and ground. Limiting viscosity (10% sodium chloride solution): 1640 ml/g.

EXAMPLE 29

Homopolymer of
N-(3-dimethylamino-2,2-dimethylpropyl)methacrylamide.½H$_2$SO$_4$ (TEMAPMA.½H$_2$SO$_4$)

80 g TEMAPMA was dispersed in 40 g water and neutralized with 100 g 20% sulfuric acid, purged of oxygen and, after addition of 100 mg AIBA, exposed for 1 hour to light (OSRAM HWL 250 watts).

Brookfield viscosity of the dried polymer (1% aqueous solution): 240 mPa/s.

EXAMPLE 30

Copolymer of acrylamide (75 wt. %) and
TEMAPMA.½H$_2$SO$_4$(25 wt.%)

150 g acrylamide was dissolved in 470 g water, 40 g TEMAPMA was added and the solution was neutralized with 50 g 20% sulfuric acid. After the addition of 25 mg AIBA, the solution was purged of oxygen and exposed to light for 30 minutes (OSRAM HWL 250 watts). The gel obtained was dried and ground.

Brookfield viscosity (1% aqueous solution): 3800 mPa/s.

EXAMPLE 31

The products obtained by the process of the invention were tested as sedimentation aids in flocculating tests. The flocculating behavior of copolymers according to Examples 26 and 28 was tested by determining the rate of sedimentation in an aqueous solution after their addition to aqueous clay suspensions prepared in the usual way by slurrying kaolin in water and adjusting with Al$_2$(SO$_4$) solution to a pH value of about 4.8. The results are presented in Table I.

TABLE I

Flocculating effect on a clay suspension with 20 g/l
solids content with the addition of Al$_2$(SO$_4$),
product in 0.1% solution, concentration 2 ppm

| Product | Time (sec) |
|---|---|
| None | 180 |
| According to Example 26 | 2.5 |
| According to Example 28 | 4.3 |

With regard to the conduct of the test, see H. Akyel and M. Neven, Chemie-Ingenieur-Technik 39 (1967), 172.

Moreover, the products described may also be used to dewater sewage sludges.

Dewatering test with sewage sludge; solids content, 3.7%.

| Dewatering aid | Amount used (g/cm$^3$) | Solids in effluent (%) | Supernatant Appearance | Extinction (× 100) |
|---|---|---|---|---|
| Product according to Example 26 | 190 | 26.4 | White | 20 |
| Product according to Example 28 | 200 | 25.8 | White | 20 |

EXAMPLE 32

The copolymers produced in accordance with Examples 26 and 28 were then tested for their suitability for use as dewatering aids and retention aids in papermaking.

(a) Dewatering

Testing apparatus and method

The Schopper-Riegler degree-of-fineness tester ("SR apparatus") was used as testing apparatus. To measure the time required to dewater a solids suspension, the overflow is introduced into the measuring cylinder of the apparatus together with the nozzle effluent and the dewatering time $t_E$ is determined in seconds for 600 ml of the screen water. Whenever possible, the degree of fineness of the solids should not be under 55° SR. As under the standard conditions for °SR measurements, the solids suspension contains 2 g atro/l.

Fibrous-material suspension

In this case, 400 g of rotopaper was broken up into 20 l of water and ground for 2 hours in a Valley hollander at a low load to 55° to 57° SR.

Test results 0 sample (without additive): $t_E=44$ sec.

| Dosage (%) | Product | $t_E$ (sec) |
|---|---|---|
| 0.2 | According to Example 26 | 22 |
| 0.4 | | 13 |
| 0.2 | According to Example 28 | 18 |
| 0.4 | | 14 |

(b) Retention

Testing method

| Filler retention: In the RK sheet former |
|---|
| In the SR apparatus |

The test sheets for the sheet former were standardized at a basic weight of 100 g/m$^2$ and the amount of pulp in the SR apparatus at 2.0 g atro.

The retention effect in the sheet former was evaluated on the basis of the residual ash, referred to the filler addition. For testing of the retention in the SR apparatus, the degree of turbidity was measured in 600 ml of the effluent water with a Lange colorimeter.

3. Test results 3.1 Retention in sheet former

Dosage: 0.02% retention aid/pulp

| Filler addition % | RETENTION (%) | | |
|---|---|---|---|
| | Control | Product Example 26 | Product Example 28 |
| 10 | 30.4 | 87.0 | 85.2 |

-continued

| Filler addition % | RETENTION (%) | | |
|---|---|---|---|
| | Control | Product Example 26 | Product Example 28 |
| 20 | 35.2 | 85.1 | 83.2 |
| 30 | 33.0 | 83.4 | 73.8 |
| 40 | 33.3 | 82.3 | 79.8 |

3.2 Retention in SR apparatus
Dosage: 0.02% retention aid/pulp

| Filler addition % | ABSORPTION (%) | | |
|---|---|---|---|
| | Control | Product Example 26 | Product Example 28 |
| 20 | 27.0 | 0.5 | 2.0 |
| 40 | 65.5 | 10.0 | 14.0 |
| 60 | 80.0 | 25.0 | 30.0 |

EXAMPLE 33

Copolymer TEMAPA/dodecylmethacrylate (90:10 wt. %)

23.33 g TEMAPA and 210 g dodecylmethacrylate were heated to 80° C. with 0.1167 g dodecylmercaptan in 116.67 g neutral oil (BP ENERTHENE 1269) and polymerized by the metered addition of a total of 1.2 g AIBN over a period of 5 hours. Two parts of the resulting highly viscous reaction product were mixed with another 98 parts of BP ENERTHENE 1269 and used in the tests described below.

EXAMPLE 34

Copolymer TEMAPMA/dodecylmethacrylate (10:90 wt. %)

Analogously to Example 31, a mixture of a copolymer of TEMAPMA/dodecylmethacrylate in neutral oil was prepared.

The effect of the above copolymers on the viscosity of the neutral oil was determined by determining the viscosity index in conformity with ASTM D 2270-77. Moreover, the dispersing properties of the above copolymers were tested on the basis of the sedimentation behavior of a coal-dust suspension in neutral oil.

| | Viscosity (cSt) | | | Percent coal still dispersed after standing for 4 days |
|---|---|---|---|---|
| | 40° C. | 100° C. | VIE | |
| BP ENERTHENE 1269 without additive | 4.29 | 1.48 | 79 | 50% |
| BP ENERTHENE 1269 with additive (Product according to Example 31) | 6.763 | 2.353 | ~168 | 100% |
| BP ENERTHENE 1269 with additive (Product according to Example 32) | 6.985 | 2.403 | ~168 | 100% |

EXAMPLE 35

Homopolymer of propylene-bis[(3-acrylamido-2,2-dimethyl)propyldimethylammonium]dibromide 73.7 g TEMAPA and 40.4 g 1,3-dibromopropane were stirred in 50 g water for 6 hours at 90° C. and then cooled to 40° C., and polymerization was then initiated by addition of 0.5 g potassium persulfate. The crosslinked polymer obtained was dried to a residual water content of 10%, comminuted, and tested for its ion-exchange properties. Ion-exchanger capacity: 3.1 mVal/g ($Br^-$ form).

We claim:

1. A polymer containing repeating units of the formula $$\begin{array}{c} R^1\ R^2 \\ |\ \ | \\ -C-C- \\ |\ \ | \\ H\ \ C=O \\ \ \ \ \ | \\ \ \ \ \ NH-(CH_2)_n-C-CH_2-N \end{array} \begin{array}{c} R^6\ \ R^7 \\ \diagdown\diagup \\ \\ \diagup\diagdown \\ R^4 \\ R^5 \end{array} \text{ or}$$

$$\begin{array}{c} R^1\ R^2 \\ |\ \ | \\ -C-C- \\ |\ \ | \\ H\ \ C=O \\ \ \ \ \ | \\ \ \ \ \ NH-(CH_2)_n-C-CH_2-\overset{\oplus}{N} \end{array} \begin{array}{c} R^6\ \ R^7 \\ \diagdown\diagup \\ \\ \diagup\diagdown \\ R^3 \\ R^4 \\ R^5\ A^\ominus \end{array}$$

in which
$R^1$ and $R^2$ each independently is hydrogen or methyl,
$R^6$ and $R^7$ each independently is alkyl having 1 to 4 carbon atoms or aryl, or together form an aliphatic ring,
n is a number from 0 to 10,
$R^4$ and $R^5$ each independently is alkyl having 1 to 4 carbon atoms, or cycloalkyl having 3 to 8 carbon atoms,
$R^3$ is hydrogen or alkyl with 1 to 4 carbon atoms, and
A is a salt-forming anion.

2. A polymer containing repeating units according to claim 1 and units of a vinyl aromatic, vinyl ester, vinyl ether, or an acrylic compound.

3. A copolymer according to claim 1, also containing repeating units of at least one of styrene, α-methylstyrene, vinylpiridine, acrylonitrile, methacrylonitrile, acrylamide, methacrylamide, N-monosubstituted acrylamide or methacrylamide, N-disubstituted acrylic or methacrylic acid amide, an acrylic acid ester, a methacrylic acid ester, acrylic acid, methacrylic acid, a vinyl ester, a vinyl ether, fumaric acid, maleic acid, divinylbenzene, methylenebisacrylamide and allyl acrylate.

4. A copolymer according to claim 1 also containing repeating units of N-mono or di-substituted acrylamide or methacrylamide.

5. A copolymer according to claim 1, containing 5 to 60 weight percent of the indicated units.

6. A copolymer according to claim 1, containing 10 to 50 weight percent of the indicated units.

7. A homopolymer according to claim 1.

8. In the flocculation and sedimentation of solids in a dispersion, the dewatering of sewage sludge, the dewatering of a papermaking slurry, aiding retention in papermaking, modifying mineral oil by incorporating an additive therein and/or effecting ion exchange, the improvement which comprises employing therefor a polymer according to claim 1.

* * * * *